United States Patent
Pockrandt

(10) Patent No.: US 6,654,885 B1
(45) Date of Patent: Nov. 25, 2003

(54) METHOD FOR AUTHORIZATION CHECKING AND CONFIGURATION FOR CARRYING OUT THE METHOD

(75) Inventor: Wolfgang Pockrandt, Reichertshausen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/465,282

(22) Filed: Dec. 16, 1999

Related U.S. Application Data

(63) Continuation of application No. PCT/DE98/01043, filed on Apr. 9, 1998.

(30) Foreign Application Priority Data

Jun. 16, 1997 (DE) .......................................... 197 25 444

(51) Int. Cl.[7] ................................................. H04L 9/30
(52) U.S. Cl. ....................... 713/169; 713/184; 380/225; 380/261; 380/262
(58) Field of Search .............................. 380/260, 262, 380/225, 261; 713/169, 184

(56) References Cited

U.S. PATENT DOCUMENTS

| | | | | |
|---|---|---|---|---|
| 4,856,063 A | * | 8/1989 | McCalmont | ................. 380/262 |
| 4,885,778 A | | 12/1989 | Weiss | |
| 5,120,939 A | * | 6/1992 | Claus et al. | ................. 235/382 |
| 5,237,593 A | * | 8/1993 | Fisher et al. | ................. 375/367 |
| 5,363,448 A | * | 11/1994 | Koopman, Jr. et al. | ..... 713/170 |
| 5,524,052 A | * | 6/1996 | Augustine et al. | .......... 713/150 |
| 5,661,807 A | * | 8/1997 | Guski et al. | ................. 713/159 |
| 5,768,382 A | * | 6/1998 | Schneier et al. | ............ 380/251 |
| 5,923,763 A | * | 7/1999 | Walker et al. | ................. 380/51 |
| 5,953,420 A | * | 9/1999 | Matyas, Jr. | ................. 713/171 |
| 5,966,446 A | * | 10/1999 | Davis | ......................... 713/178 |
| 6,104,729 A | * | 8/2000 | Hellum et al. | ............... 370/503 |
| 6,134,531 A | * | 10/2000 | Trewitt et al. | ................. 705/10 |
| 6,215,876 B1 | * | 4/2001 | Gilley | ........................ 380/260 |

FOREIGN PATENT DOCUMENTS

| | | |
|---|---|---|
| DE | 43 28 781 A1 | 3/1995 |
| DE | 44 11 780 A1 | 10/1995 |
| EP | 0 636 963 A2 | 2/1995 |

OTHER PUBLICATIONS

Russian Examination Report, May 7, 2002.

* cited by examiner

Primary Examiner—Gilberto Barron
Assistant Examiner—Paul Callahan
(74) Attorney, Agent, or Firm—Laurence A. Greenberg; Werner H. Stemer; Ralph E. Locher

(57) ABSTRACT

The system checks whether authorization exists for at least two data processing devices to exchange data with one another. In the preferred embodiment, both data processing devices are of identical design. Check data are simultaneously produced, in response to a trigger signal, in both data processing devices. The check data are compared with one another in the data processing device to which a control function has been allocated.

6 Claims, 5 Drawing Sheets

METHOD FOR AUTHORIZATION CHECKING AND CONFIGURATION FOR CARRYING OUT THE METHOD

CROSS-REFERENCE TO RELATED APPLICATION

This is a continuation of copending International Application PCT/DE98/01043, filed Apr. 9, 1998, which designated the United States.

BACKGROUND OF THE INVENTION

Field of the Invention

The invention lies in the data processing and processor security fields. More specifically, the invention relates to a method for checking whether authorization exists for at least two data processing devices which are connected to one another to interchange data with one another, and to a configuration for carrying out the method.

Nowadays, data interchange between two or more data processing facilities is a normal activity. In this context, the question as to whether the data processing facilities that are connected to one another are authorized to interchange data in general or to interchange specific data is becoming increasingly important. Such a check is required whenever the information or data that are accessible in a data processing device are intended to be accessible only to a specific group of people or to the data processing facilities associated with that group of people.

Normally, this check is carried out in such a way that secret identification or keywords are interchanged which allow the authorization to be identified. The problem with the conventional method is the fact that, if the data transmission path is monitored, the keyword can be extracted by virtue of its regular use. Furthermore, there is a risk that, if the keyword is stored in at least one of the data processing facilities, it can easily be extracted. In both cases, there is a risk of misuse of a keyword, and thus of unauthorized access to information.

SUMMARY OF THE INVENTION

It is accordingly an object of the invention to provide a method for authorization checking and a corresponding configuration for carrying out the novel method, which overcomes the above-mentioned disadvantages of the heretofore-known devices and methods of this general type and which increases the level of difficulty in determining the keyword.

With the foregoing and other objects in view there is provided, in accordance with the invention, a method of checking whether authorization exists for at least two mutually interconnected data processing devices to exchange data with one another. The method comprises the following steps:

producing check data in each of at least two data processing devices in response to a trigger signal;

transmitting the check data from one of the data processing devices to another one of the data processing devices;

comparing, in the other data processing device, the check data produced therein with the check data transmitted from the one data processing device; and deciding, based on an outcome of the comparing step, whether authorization exists for data interchange between the at least two data processing devices.

Due to the fact that check data are not permanently stored in the data processing devices which are provided for data interchange but are instead in each case produced in a new way before the data interchange, it is impossible to extract any permanently stored keyword or password. Due to the fact, furthermore, that it is possible to produce different check data before each data transmission, the difficulty in determining the check data by monitoring the data transmission path is also increased.

In accordance with an added feature of the invention, the trigger signal is simultaneously supplied to the at least two data processing devices.

In accordance with an alternative feature of the invention, the trigger signal is received first with one of the at least two data processing devices.

In accordance with an additional feature of the invention, a preliminary determination is effected as to which of the at least two data processing devices is to process the comparing step.

In accordance with again a further feature of the invention, a determination is rendered as to which of the at least two data processing devices is to carry out the comparison of the check data based on which of the at least two data processing devices produces the check data first.

In accordance with again another feature of the invention, the check data are transmitted in encrypted form. Furthermore, it is possible to compare the check data in encrypted form.

With the above and other objects in view there is also provided, in accordance with the invention, a configuration for performing the above-outlined method for checking whether authorization exists for at least two mutually interconnected data processing devices to exchange data with one another. The configuration comprises:

at least two mutually interconnected data processing devices;

each of the data processing devices having an input for receiving trigger signal;

each of the data processing devices having a data generator and an interface device adapted to receive and to transmit data; and at least one of the data processing devices having a comparison device adapted to compare check data produced in the at least one data processing device with check data received from another of the data processing devices, and to transmit a comparison signal.

When the trigger signal is supplied simultaneously to the data processing devices provided for the data transmission, it is not possible for either that data processing device which receives the trigger signal first or has produced the check data first, or for a data processing device where a different selection scheme is used to define who transmits the check data for checking and who receives that data, to predict directly the time at which the check data are transmitted from which data processing device to which data processing device. Furthermore, it is possible by encryption to make it harder to extract the check data. In each case, it is provided that the check data are compared with one another in one of the data processing devices, and the check result is used to decide whether or not data interchange is authorized.

Other features which are considered as characteristic for the invention are set forth in the appended claims.

Although the invention is illustrated and described herein as embodied in a method for authorization checking and configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
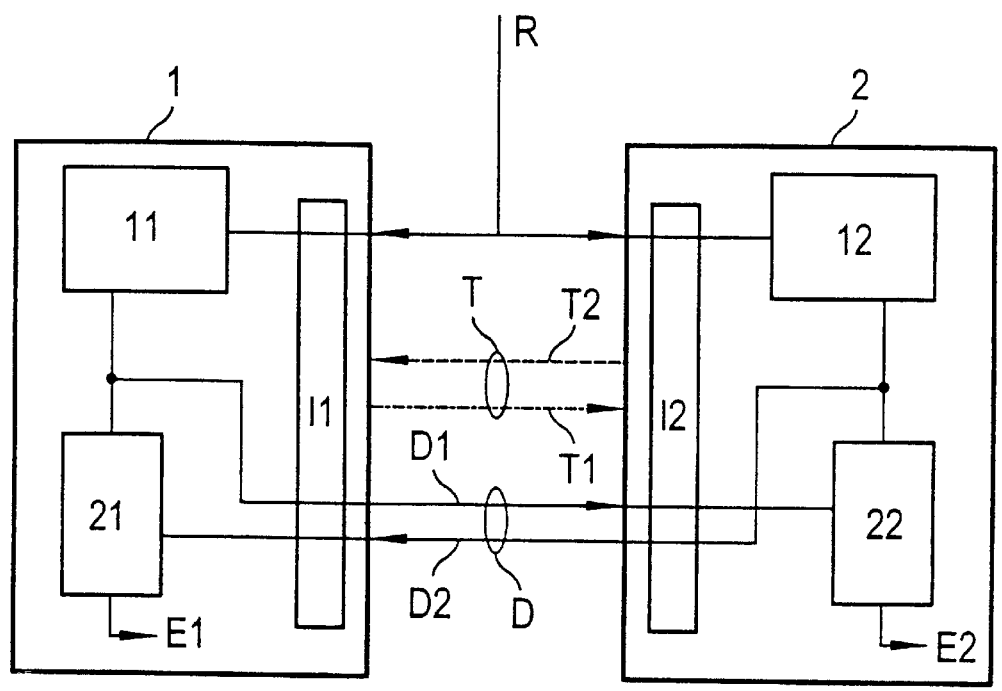
FIG. 1 is a basic block diagram of the fundamental layout of the configuration according to the invention.

Referring now to the figures of the drawing in detail and first, particularly, to FIG. 1 thereof, the immediately following text contains a description of the basic principle of the method according to the invention and the basic design of the novel configuration according to the invention.

The reference symbols 1 and 2 denote two data processing devices which have a functionally corresponding design. Each of the two data processing devices 1 and 2 has an interface arrangement I1, I2 via which data and/or information are received and/or transmitted. Furthermore, a data generator 11, 12 is provided, in which check data are produced. Finally, a comparison device 21, 22 is provided, which compares the check data.

A trigger or initialization signal R is supplied, in the present exemplary embodiment, to both data processing devices 1, 2. In response to the trigger signal R, which is supplied via the interface arrangement I1 to the data generator 11, the latter produces check data. Since the trigger signal R is supplied simultaneously via the interface arrangement I2 to the data generator 12 in the data processing device 2, the latter produces check data at the same time as the data generator 11 in the data processing device 1. The check data which are produced by the data generator in the data processing device 1 are transmitted via the interface arrangement I1 as check data D1 to the data processing device 2, where they are compared in the comparison device 22 with the check data produced by the data generator 12. In response to the comparison result, the comparison device 22 emits an output signal E2 which is significant for determining whether data interchange with the data processing device 1 is authorized.

At the same time, the check data produced in the data processing device 2 are transmitted to the data processing device 1, where they are received as check data D2 via the interface arrangement I1 and are supplied to the comparison device 21. The check data which are produced in the data generator 11 are compared with the check data D2 in the comparison device 21, in a corresponding manner to the comparison device 22. Depending on the comparison result, a signal E1 is produced by the comparison device 21, which is significant for determining whether data interchange is or is not authorized.

Although, in the exemplary embodiment according to FIG. 1, the design of the two data processing devices 1 and 2 is functionally equivalent, there is not necessarily any requirement for an identical parallel sequence. For example, it is possible for that data processing device which receives the trigger signal R first always to transmit the check data to the other data processing device for comparison. In the same way, it is possible for the comparison of the check data to be carried out in the data processing device which has received the trigger signal R first. It is just as possible for this selection criterion to be used to determine which data processing device has produced the check data first or else has received them first. Finally, it is possible for one of the two data processing devices to be provided permanently for comparison of the check data. In this case, the transmission path D for the transmission of check data does not need to be bidirectional but only for transmission of the check data in one direction. Finally, however, it is also conceivable for the check data to be compared either by the comparison device 21 or by the comparison device 22 in accordance with a specific changeover scheme.

In all cases, it may be advantageous to provide a clock transmission path T via which a clock signal T1 is transmitted from the data processing device 1 to the data processing device 2 and/or a clock signal T2 is transmitted from the data processing device 2 to the data processing device 1.

Figure 2:
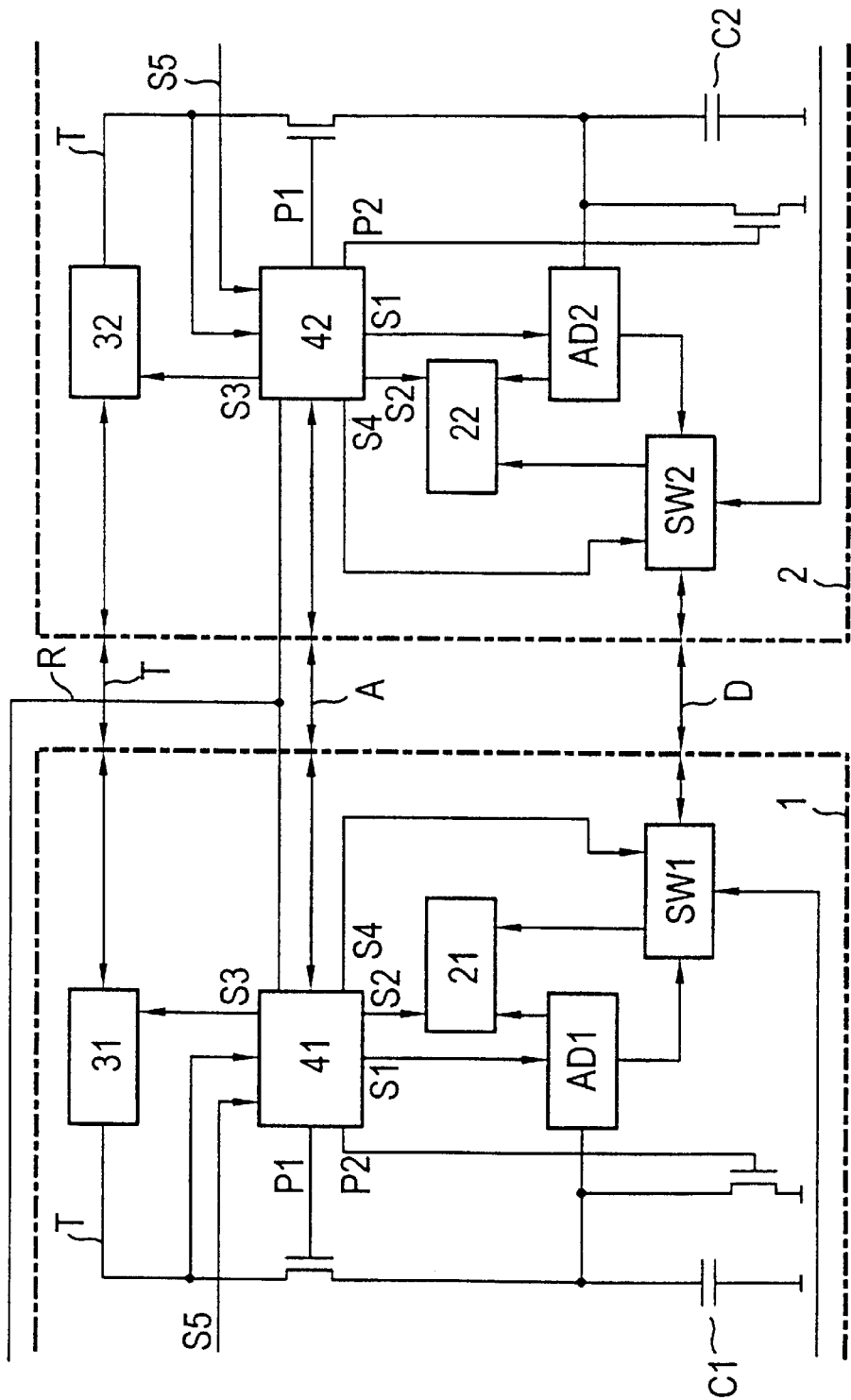
FIGS. 2 to 4 are detailed schematic block diagrams of three different design versions of a first exemplary embodiment of the invention.

Referring now to FIG. 2, there is shown the basic arrangement illustrated in FIG. 1, with further details. A data processing device 1 and a data processing device 2 are once again provided. A trigger signal R is supplied to these data processing devices.

In the case of this exemplary embodiment as well, the arrangements in both data processing devices 1, 2 are once again functionally equivalent. For example, once the trigger signal R has been supplied, the data processing device 1 is given a control function and supplies a clock T, which is produced by a clock generator 31. A cyclic program runs synchronously under clock control in both activation logic arrangements 41, 42 of the two data processing devices 1, 2, as a result of which signals P1, P2 and S3 are produced in the two data processing devices 1, 2. The signal S3 is used in the data processing device 1 to control the clock frequency of the clock generator 31. Furthermore, the signals P1 and P2 together with the clock signal T control the charge state of a capacitor C1. In addition to the fixed advance determination that the data processing device 1 has the control function, this arrangement can be effected in such a manner that a control signal S5 is respectively supplied to the activation logic arrangement 41, 42 in both data processing devices 1, 2. In this case, the determination is made as has been explained, for example, with reference to FIG. 1.

Optionally, transmission of an activation signal A is also provided for this determination, by means of which activation signal A one of the two data processing devices 1, 2 reports to the respective other device that it has taken over the control function. In any case, suitable precautions are taken to prevent both data processing devices 1, 2 taking over the control function at the same time, which would necessarily lead to malfunctions.

As already stated, it is intended to assume that the data processing device 1 has taken over the control function. In order to prevent easy identification of the check data, the data processing device 2 transmits random data as transmission data D to the data processing device 1. While this is happening, the capacitors C1, C2 in both data processing devices 1, 2 are simultaneously charged and are interrogated at a specific time. The interrogation time is thereby either permanently predetermined, running as a function of the clock frequency, or else is defined by transmitting the activation signal A from one of the two data processing devices 1, 2. Controlled by the signal S4, the voltage level on the capacitor C1, C2 is converted to a digital numerical value via A/D converters AD1, AD2. In this case, the A/D converter AD1 supplies the digitized voltage level of the capacitor C1 to the comparison device 21, while the digitized voltage level of the capacitor C2 is transmitted by the A/D converter AD2, via a changeover switch SW2 in the data processing device 2, to the data processing device 1. Here, the transmitted data D received as check data are supplied via a switching device SW1 to the comparison device 21. The comparison device 21 checks the two check data items and determines whether authorization exists for further data interchange. The authorization need not necessarily depend on the compared check data being equal or identical. Any functional relationship between the check data is also conceivable. However, only relationships which allow a clear statement to be made are practical.

Figure 3:
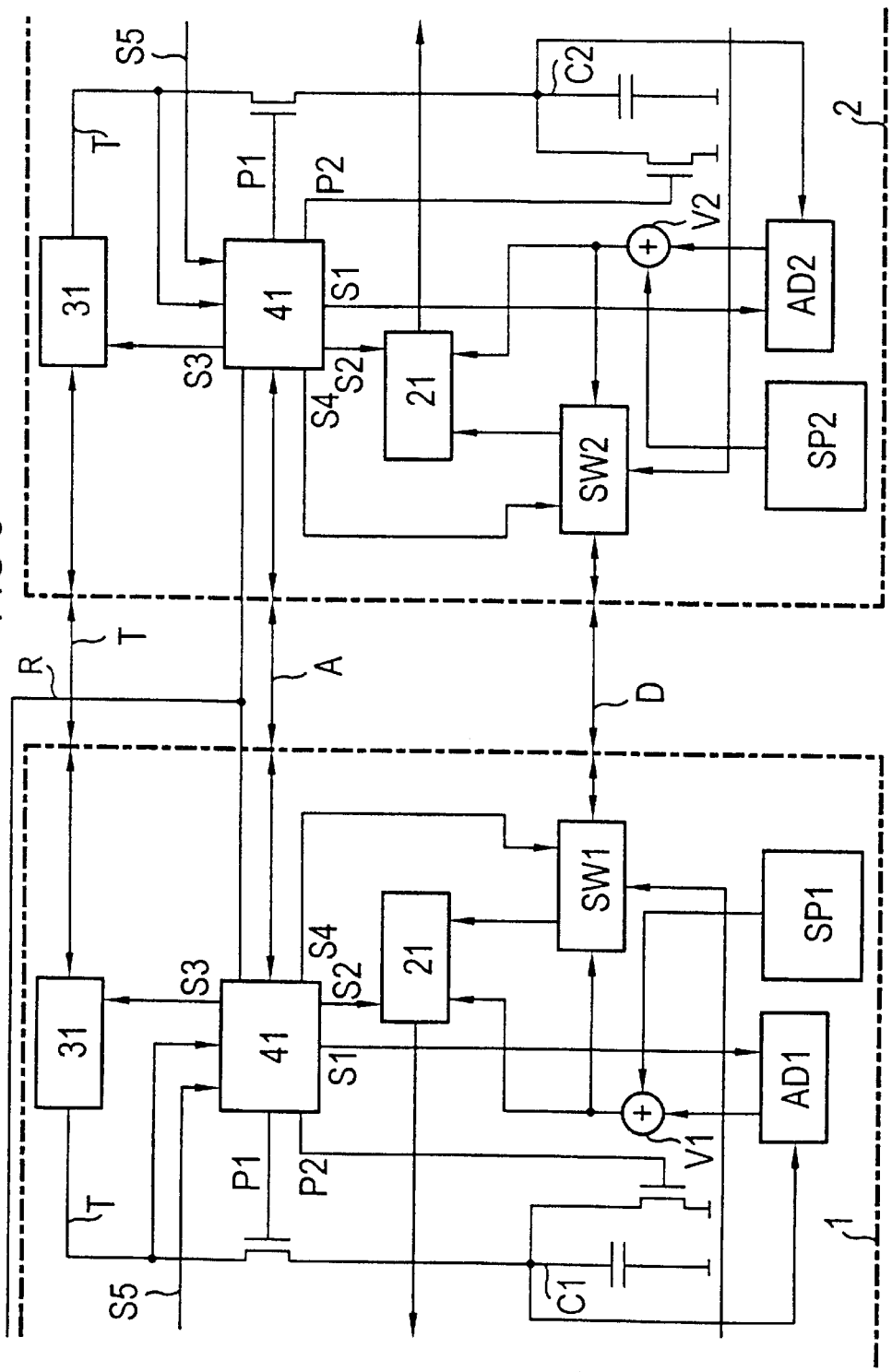

FIG. 3 illustrates a further refinement of the previous exemplary embodiment, identical elements having the same reference symbols. The major difference from the configuration illustrated in FIG. 2 is that the voltage level from the capacitor C1, C2 converted in the A/D converter AD1, AD2 is linked in a logic device V1, V2 with a codeword from a codeword memory SP1, SP2, in order then to supply it to one of the comparison devices 21, 22.

Figure 4:
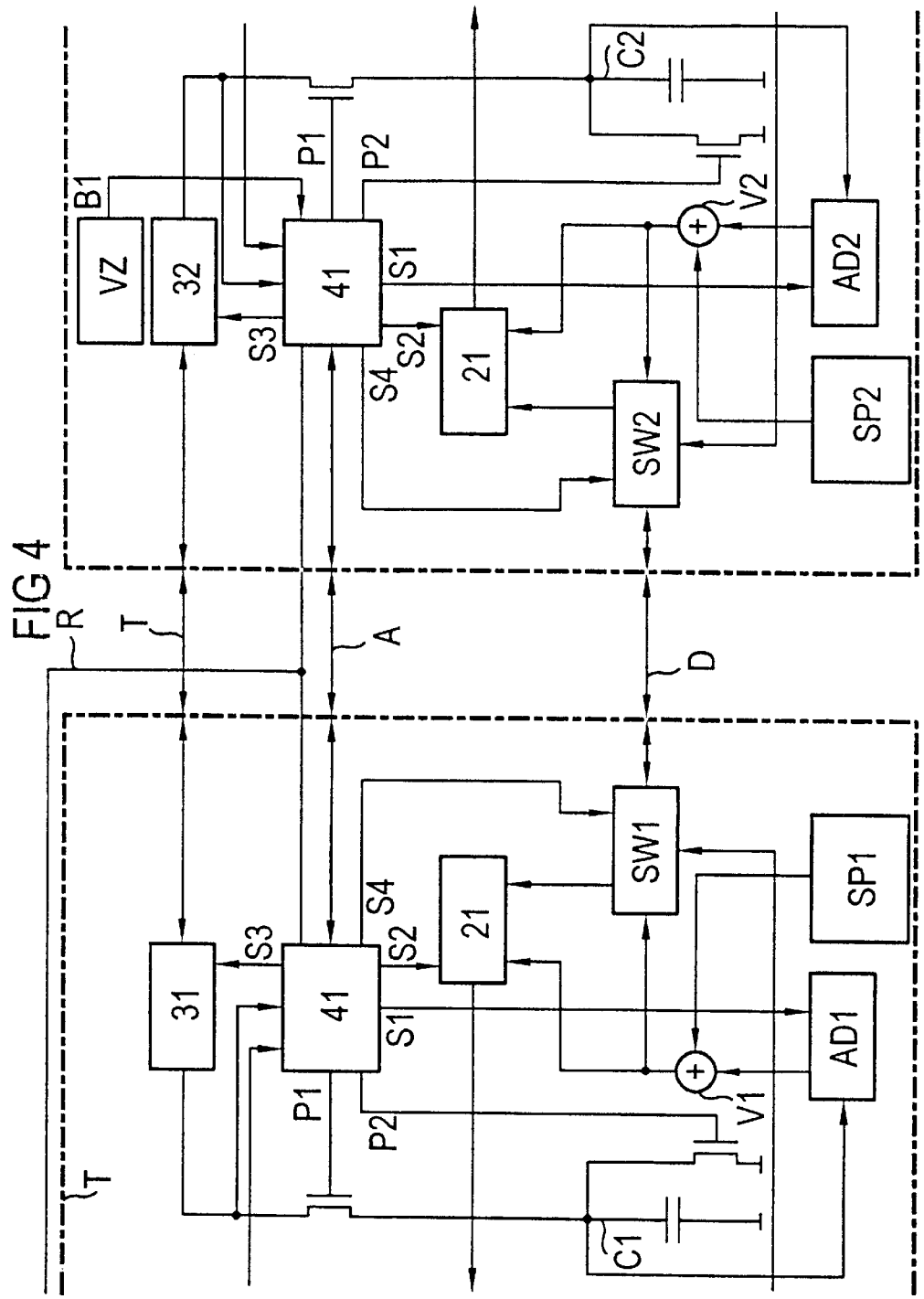

The refinement illustrated in FIG. 4 differs from the refinement illustrated in FIG. 3 in that the data processing device 2 contains an attempt counter VZ which counts the number of attempts, in order to achieve the authorization for data interchange. If a predetermined number is exceeded in the process, the activation logic 42 is inhibited via a control signal P1. The attempt counter VZ can be reset only by means of a successful attempt.

Figure 5:
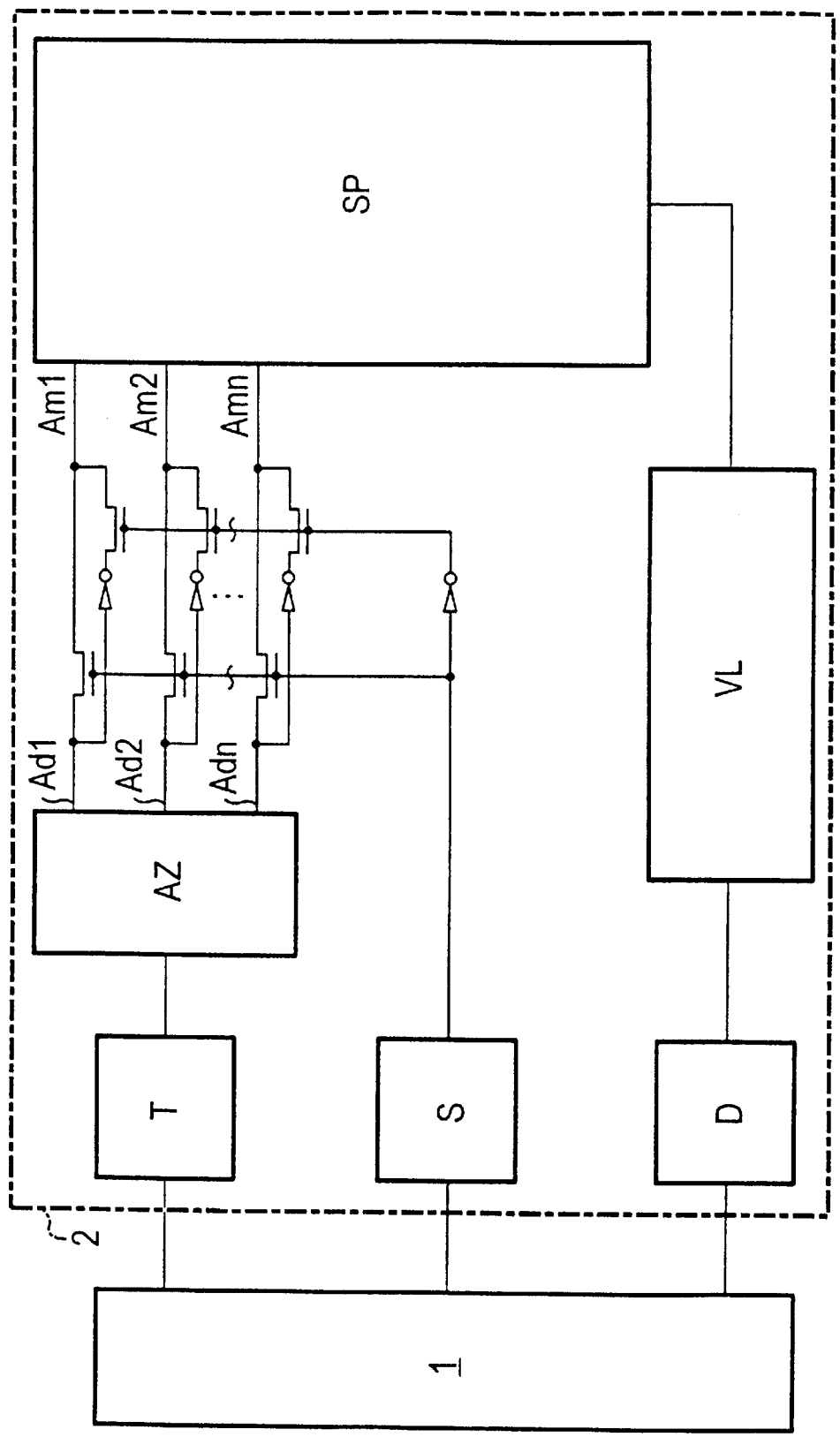
FIG. 5 is a schematic block diagram of a second exemplary embodiment of the invention.

The exemplary embodiment illustrated in FIG. 5 shows a further example for the production of the check data. Two identically designed data processing devices 1, 2 are provided in this exemplary embodiment as well. One of the options mentioned above is now intended to be used to define the data processing device 1 as having the control function. In this case, a keyword is stored in a keyword memory SP. The keyword extends over a predetermined number of n memory areas, which are addressed via address lines Am1, Am2 to AmMN and are read out to a comparison or computation logic device VL. Here, the segment of the keyword or a plurality of segments composed to form a new keyword are passed on to the data processing device 1, in which case the check data produced in this way can be coded in the comparison or computation logic device VL. The comparison with the correspondingly produced check data is then carried out in the corresponding comparison or computation logic device in the data processing device 1.

As illustrated in FIG. 5, the address lines Am1 to Amn are driven in such a manner that the transmission of a clock T is used to operate an address counter which indicates at outputs Ad1 to And an address which, in turn, manipulates the address of the address counter via a supplied control signal S of the illustrated selection circuit.

The illustrated manipulation circuit can be modified as required, in which case the address can be manipulated by a logic circuit of any required type. Furthermore, the control signal is advantageously produced by a random number generator in the data processing device 1.

Finally, it should be understood that the exemplary embodiment according to FIG. 5 can be combined in any feasible form with the exemplary embodiment according to FIGS. 2 to 4 and 1. It is also provided for the trigger signal to be emitted by one of the data processing devices 1, 2 and that the control function can be changed from one of the data processing devices to the respective other device.

I claim:

1. A method of checking whether authorization exists for at least two mutually interconnected data processing devices to exchange data with one another, which comprises:

producing check data in each of at least two data processing devices in response to a trigger signal;

transmitting the check data from one of the data processing devices to another one of the data processing devices;

comparing, in the other data processing device, the check data produced therein with the check data transmitted from the one data processing device;

deciding, based on an outcome of the comparing step, whether authorization exists for data interchange between the at least two data processing devices; and in one of the data processing devices, generating a common clock signal for the data processing devices.

2. The method according to claim 1, which comprises supplying the trigger signal simultaneously to the at least two data processing devices.

3. The method according to claim 1, which comprises receiving the trigger signal first with one of the at least two data processing devices.

4. The method according to claim 1, wherein the transmitting step comprises transmitting the check data in encrypted form.

5. The method according to claim 4, which comprises comparing the encrypted check data.

6. A configuration for checking whether authorization exists for at least two mutually interconnected data processing devices to exchange data with one another, comprising:

at least two mutually interconnected data processing devices;

each of said data processing devices having an input for receiving trigger signal;

each of said data processing devices having a data generator and an interface device adapted to receive and to transmit data;

at least one of said data processing devices having a comparison device adapted to compare check data produced in said at least one data processing device with check data received from another of said data processing devices, and to transmit a comparison signal; and one of said data processing devices including a clock generator for generating a common clock signal for said data processing devices.

* * * * *